US008938674B2

(12) United States Patent  
Adolph et al.

(10) Patent No.: US 8,938,674 B2  
(45) Date of Patent: Jan. 20, 2015

(54) MANAGING MEDIA PLAYER SOUND OUTPUT

(75) Inventors: Paul Adolph, San Jose, CA (US); Dan Sletten, Tokyo (JP); Spencer Shanson, Menlo Park, CA (US); Pankaj Shah, San Jose, CA (US); Don Woodward, Monte Sereno, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1409 days.

(21) Appl. No.: 12/484,691

(22) Filed: Jun. 15, 2009

(65) Prior Publication Data

US 2013/0167027 A1 Jun. 27, 2013

Related U.S. Application Data

(60) Provisional application No. 61/170,877, filed on Apr. 20, 2009.

(51) Int. Cl.
```
G06F 3/00      (2006.01)
G06F 3/0482    (2013.01)
G06F 3/0488    (2013.01)
```
(52) U.S. Cl.
CPC ............ *G06F 3/0482* (2013.01); *G06F 3/0488* (2013.01)
USPC ........................................................ 715/716

(58) Field of Classification Search
CPC . G06F 3/0482; G06F 3/0484; G06F 3/04842; G06F 3/0488
USPC ........................................................ 715/716
See application file for complete search history.

(56) References Cited

U.S. PATENT DOCUMENTS

| | | | |
|---|---|---|---|
| 2002/0161797 A1* | 10/2002 | Gallo et al. | 707/500.1 |
| 2003/0115598 A1* | 6/2003 | Pantoja | 725/40 |
| 2004/0177151 A1* | 9/2004 | Kryeziu | 709/233 |
| 2004/0225994 A1* | 11/2004 | Wason et al. | 717/100 |
| 2005/0033972 A1* | 2/2005 | Watson | 713/189 |
| 2006/0184980 A1* | 8/2006 | Cole | 725/88 |
| 2006/0206493 A1* | 9/2006 | Lipscomb et al. | 707/10 |
| 2006/0253547 A1* | 11/2006 | Wood et al. | 709/217 |
| 2007/0186180 A1* | 8/2007 | Morgan | 715/779 |
| 2008/0005653 A1* | 1/2008 | Swaminathan et al. | 715/500.1 |
| 2008/0313262 A1* | 12/2008 | Cho et al. | 709/201 |

(Continued)

OTHER PUBLICATIONS

'Adobe and Industry Leaders Establish Open Screen Project' [online] Adobe Systems Incorporated, 2008 [retrieved on May 17, 2010]. Retrieved from the Internet: <URL: http://www.adobe.com/aboutadobe/pressroom/pressreleases/pdfs/200805/050108AdobeOSP.pdf>.

(Continued)

*Primary Examiner* — Tuyetlien Tran
(74) *Attorney, Agent, or Firm* — Wolfe—SBMC

(57) ABSTRACT

A method includes initiating media player instances for producing output by execution on an electronic device. Each of the media player instances is implemented using a modular framework on the electronic device configured to have each of multiple types of media player runtimes implemented therein and to host modules that configure any of the types of media player runtimes for respective device types. The method includes determining, using a sound module of the modular framework, which of the media player instances should be used for audio output by the electronic device. The method includes generating the audio output using the electronic device, the audio output produced by at least one of the media player instances as determined.

21 Claims, 5 Drawing Sheets

(56) References Cited

U.S. PATENT DOCUMENTS

| | | | |
|---|---|---|---|
| 2008/0313632 A1* | 12/2008 | Kumar et al. | 718/100 |
| 2009/0106104 A1* | 4/2009 | Upendran et al. | 705/14 |
| 2009/0125812 A1* | 5/2009 | Blinnikka et al. | 715/716 |
| 2009/0177301 A1* | 7/2009 | Hayes | 700/94 |
| 2009/0228897 A1* | 9/2009 | Murray et al. | 719/313 |
| 2010/0011050 A1* | 1/2010 | Allard | 709/203 |
| 2010/0158288 A1* | 6/2010 | Winter | 381/311 |
| 2010/0180201 A1* | 7/2010 | Gibby et al. | 715/716 |
| 2010/0180284 A1* | 7/2010 | Ross | 719/330 |

OTHER PUBLICATIONS

'Adobe Flash Player' [online]. Wikipedia, 2008 [retrieved May 17, 2010]. Retrieved from the Internet: <URL: http://web.archive.org/web/20080227151844/http://en.wikipedia.org/wiki/Adobe_Flash_Player>.

Adobe's Open Screen Project: Write Once, Flash Everywhere [online]. TechCrunch, 2008 [retrieved on May 17, 2010]. Retrieved from the Internet: <URL: http://techcrunch.com/2008/04/30/adobes-open-screen-project-write-once-flash-everywhere>.

'OpenTV and Adobe Collaborate to Advance Rich Television Experiences' [online] Adobe Systems Incorporated and OpenTV, Inc., 2008 [retrieved on May 17, 2010]. Retrieved from the Internet: <URL: http://www.opentv.com/about/releases/091008Opentv.com%5B1%5D.pdf>.

'SWF File Format Specification Version 10' [online]. Adobe Systems Incorporated, 2008 [retrieved Jul. 23, 2010]. Retrieved from the Internet: <URL: http://www.adobe.com/devnet/swf/pdf/swf_file_format_spec_v10.pdf>.

Wikipedia "Picture-in-Picture" dated Nov. 21, 2007, downloaded from the internet at http://web.archive.org/web/20071129110620/http://en.wikipedia.org/wiki/Picture-in-picture on Aug. 12, 2011, 1 page.

Wikipedia "Sound Manager", dated Dec. 21, 2007, downloaded from the internet at http://web.archive.org/web/20080503055208/http:/en.wikipedia.org/wiki/Sound_Manager on Aug. 11, 2011, 1 page.

* cited by examiner

MANAGING MEDIA PLAYER SOUND OUTPUT

CROSS-REFERENCE TO RELATED APPLICATIONS

This application is a utility patent application and claims priority to U.S. Provisional Application Ser. No. 61/170,877, filed on Apr. 20, 2009, the entire contents of which are incorporated herein by reference.

BACKGROUND

This specification relates to media player technologies.

SUMMARY

This specification describes technologies related to media player applications.

In a first aspect, a method includes initiating media player instances for producing output by execution on an electronic device. Each of the media player instances is implemented using a modular framework on the electronic device configured to have each of multiple types of media player runtimes implemented therein and to host modules that configure any of the types of media player runtimes for respective device types. The method includes determining, using a sound module of the modular framework, which of the media player instances should be used for audio output by the electronic device. The method includes generating the audio output using the electronic device, the audio output produced by at least one of the media player instances as determined.

In a second aspect, a method includes creating a modular framework on an electronic device for implementing media player instances. The modular framework is configured to have each of multiple types of media player runtimes implemented therein and to host modules that configure any of the types of media player runtimes for respective device types. The method includes implementing a sound module in the modular framework, the sound module configured to determine which of the media player instances should be used for audio output by the electronic device. The method includes preparing the electronic device for execution of the media player instances, wherein the electronic device generates audio output produced by at least one of the media player instances as determined by the sound module.

The methods can be implemented using a computer program product tangibly embodied in a tangible program carrier.

In a third aspect, a system includes an electronic device configured to present media output to a user, and a computer-readable medium accessible to the electronic device. The computer-readable medium includes a modular framework configured for having each of multiple types of media player runtimes implemented therein and for hosting modules that configure any of the multiple types of media player runtimes for respective device types. The computer-readable medium includes media player instances implemented in the modular framework, each media player instance configured for execution by the electronic device to produce output. The computer-readable medium includes a sound module implemented in the modular framework, the sound module configured to determine which of the media player instances should be used for audio output by the electronic device.

Particular embodiments of the subject matter described in this specification can be implemented to realize one or more of the following advantages. Audio output from multiple media players running on an electronic device can be managed to improve user experience. Audio output can be managed to track focus of video outputs. Audio outputs can be managed to blend audio from a non-visible application output with sound from a visible application output.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
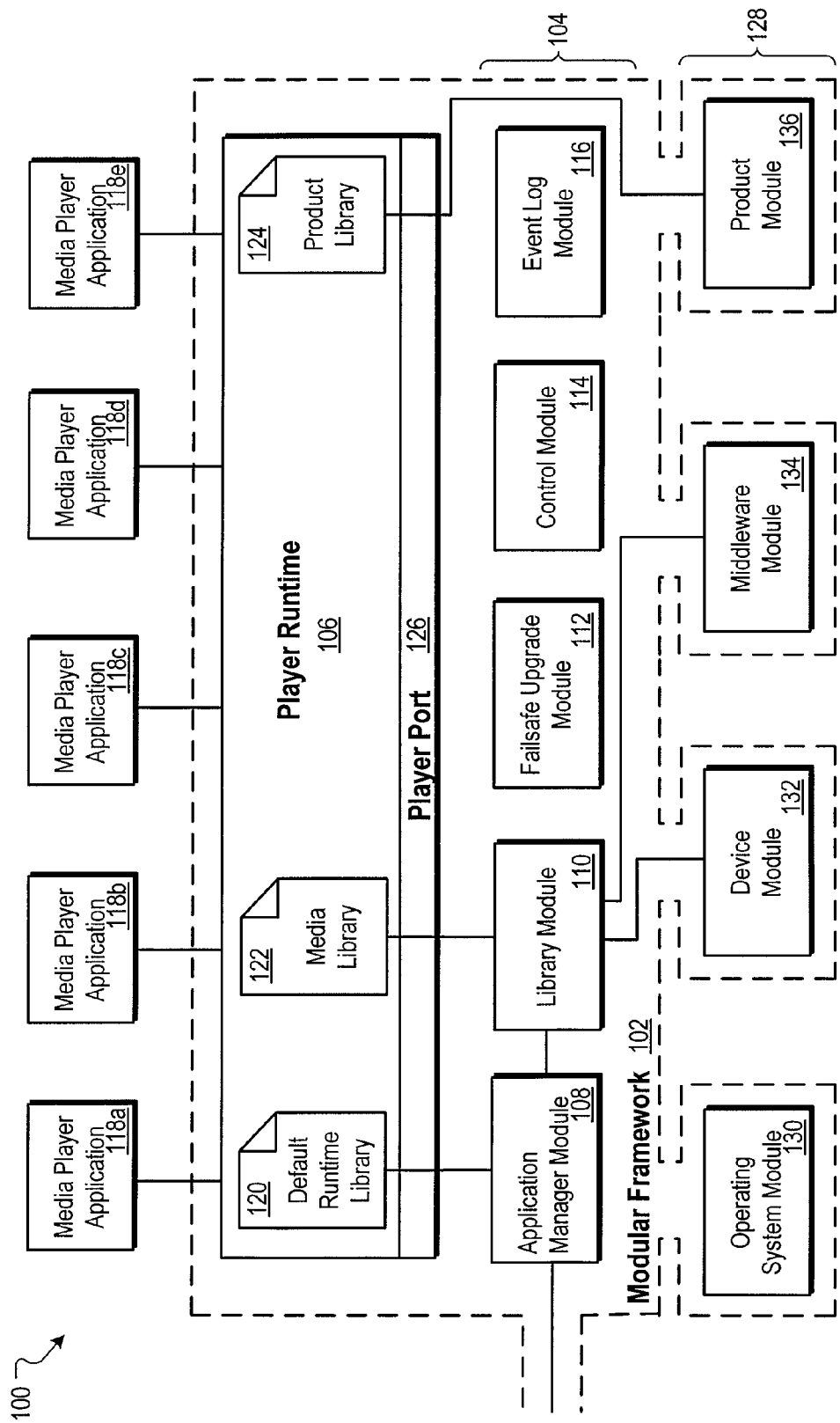
FIG. 1 is a block diagram of example software architecture for implementing modular software applications.

FIG. 1 is a block diagram of an example software architecture 100 for generating modular software applications. The software architecture 100 enables a software application to be dynamically tailored to a hardware device environment, by virtue of the device, an operating system, and other software modules. Specifically, the software architecture 100 establishes a modular framework 102 for the deployment of product software on one or more electronic devices. The modular framework 102 can be used to simplify and modularize programming interfaces for an application by modeling a virtual machine. The modular framework 102 can be used to facilitate rapid software application development by third parties (e.g., original equipment manufacturers (OEMs)). For example, an OEM can use the modular framework 102 for porting a media player application to a new platform and/or electronic device. Example electronic devices include, but are not limited to, a computer, a handheld device, a consumer electronics device, a television, a set-top box, an appliance, an electronic picture frame, a cellular telephone, a gaming device, or other electronic components.

In general, the modular framework 102 can be configured for having any or all of multiple types of media player runtimes implemented within the architecture 100. A media player runtime is defined with regard to a virtual machine which provides software services for processes or programs within an application while the application is running. Runtimes can be used to accomplish the objective of "platform independent" programming. In some implementations, the runtime software services pertain to the operating system. In other implementations, the runtime software services pertain to the software that runs beneath the environment itself.

The modular framework 102 hosts one or more independent software modules (e.g., libraries) that configure any of the multiple types of media player runtimes for respective device types. As such, the modular framework 102 functionality is determined by a set of these independent software modules placed into a particular configuration by a software developer. For example, functionality for streaming video with ad content can be provided in an application if the developer includes a "streaming" software module in a media player application configuration.

In some implementations, the modular framework 102 has the benefit of reducing or preventing cascading dependencies between modules. In this example, the modular framework 102 promotes the ability to develop features independently by allowing the software modules to be created using code that is object oriented according to object-oriented programming techniques. For example, the modules can be programmed using C++ language. The modular framework 102, in contrast, is not object oriented. For example, this manifests itself in the absence of dependencies between different modules and the ability to make functions optional from the application's perspective. Enabling the modular framework 102 to be developed using modular programming techniques, rather than object-oriented programming techniques can provide the advantage of facilitating development across geographically diverse teams. Moreover, this technique can provide software that can be executed on any arbitrary electronic device without requiring the loading of particular drivers or dynamic link libraries (DLLs) in a detailed and specific fashion.

In some implementations, the modular framework 102 is highly configurable. For example, the framework 102 can run without any included software modules or it can be configured with a sophisticated set of software modules. In this example, the modular framework 102 is configured with a variety of software modules that include application modules, control modules, library modules, and other modules. Accordingly, the modular framework 102 features are selected and configured depending on the included software modules. Such feature selection and configuration can occur at static build time or dynamically at runtime, or features can be selected and configured using a combination of both approaches.

As shown in FIG. 1, the modular framework 102 includes system modules 104 and a player runtime 106. The player runtime 106 represents any number of multiple media player instances. For example, the player runtime 106 may be configured for electronic devices by the system module 104 hosted in the modular framework 102. The player runtime 106 can interact with the virtual machine formed by one or more system modules 104. Any number of runtimes can be present in the architecture 100.

A system module represents a standalone software program which enables various features or resources for operating software on common device hardware and/or middleware. Features can include controls, libraries, upgrade mechanisms, data loggers, memory management mechanisms, and system management mechanisms, just to name a few examples. System modules can be authored in C, C++, Java, or other high-level language, to name a few examples. In operation, the modular framework 102 uses functions available in the system modules 104 to provide a unified platform-independent architecture for implementing a software application, such as a media player application. In some implementations, the system modules 104 represent software libraries that a media player software application can call using a runtime.

The system modules 104 depicted in architecture 100 include an application manager module 108, a library module 110, a failsafe upgrade module 112, a control module 114, and an event log module 116. The application manager module 108 provides a public interface that allows clients (e.g., developers, users, OEMs) to instantiate multiple instances of software applications that can run in a shared media player context or in a sandboxed player environment. For example, the application manager module 108 allows multiple applications using a media player application to be instantiated and executed on the same electronic device.

In addition to the role of application instantiation, the application manager module 108 performs the functions of validation of runtime application packages, XML-based key translation mapping for user input, and security context mapping. For example, the application manager module 108 may function to provide an application programming interface (API) for clients to implement the instantiation of applications without requiring that the client understand underlying details of the implementation. In some implementations, the application manager module 108 manages communication between instances of software applications running within and between all media player software application instances running on a particular hardware device.

The system 100 uses the application manager module 108 to include various system libraries to enable a developer to plug-in default runtime algorithms and behaviors into each new hardware platform. In a similar fashion, other modules can be included to provide accelerated portability of media player functionality to each new hardware platform. Moreover, developers can generate and include modules that are platform independent. For example, the modular framework provides a mechanism for software modules to export platform-independent public interfaces as the communication mechanism between modules hosted in the modular framework.

The implementation shown in architecture 100 is one example implementation of architecture 100. Other implementations can be used. For example, the role of the application manager may or may not be as described above. For example, other implementations of architecture 100 can organize one or more aspects of the functionality of application manager 108 described herein to other modules of such an implementation.

The ability to author applications that are not dependent on the functionality of the underlying device is here accomplished in two parts. First, an API is designed to access facilities such as local media sources (e.g., TV tuners, universal plug-and-play (UPnP) services provided by the middleware) or device capabilities (e.g., video decoders, audio decoders). These sources and device capabilities are unified through an API that supports the enumeration and generic treatment of classes of object abstractions. Secondly, the native-code layer provides implementations of generic interfaces that allow libraries in the modular framework 102 to add device capabilities and middleware services to the object system.

By developing applications that enumerate available facilities and act on them as appropriate, the applications are able to operate in a context where both UPnP services and television tuners are available, for example, and additionally in a context where only UPnP services are available, but television tuners are not. That is, the identical code for a media player application can run in corresponding versions on different electronic devices (e.g., television, computer, mobile phone, appliance, etc.) and the media player application can behave appropriately in each case without extensive code porting or changes. In some implementations, developers may choose to implement their own API designs without using the software modules. As such, developers retain the ability to extend a product runtime with self-created proprietary libraries. The proprietary libraries can be surfaced into the system as individual modules, bundled or wrapped by a module, or accessed directly by a private implementation of a module, for example. Thus, the architecture 100 provides the ability for other code in a particular system to view the functions of the proprietary libraries in a platform independent and non-proprietary way.

A library module 110 provides multiple libraries to application developers. The multiple libraries allow for device access, product access, OEM access, and service operator access to hardware device configuration and control, multimedia playback, and content services, for example. The library module 110 includes a collection of built-in classes that enable authoring of Internet applications. The library module 110 enables a developer to author complete suites of application software that operates on electronic devices in a manner that does not depend on the actual type of device or the capabilities of the device. In particular a programmer of a media player can use the library module 110 to access device configuration and control features for an electronic device independent of a type of the electronic device.

The library module 110 can include any number of functional library areas. For example, the library module 110 can include a multimedia library, a device resource management library, and others. The multimedia library area provides resources for accessing media sources, searching and retrieving media item metadata, initiating media streaming, and executing playback of media on electronic device native media players. In some implementations, the multimedia library area enables the architecture 100 to blend media with device native media.

The device resource management area provides resources for determining device capabilities and adjusting the properties of electronic hardware configurations (e.g., setting video modes, obtaining a virtual decoder instance, and calling it a player). The device resource management area generally provides dynamic access to device resources and enables the entire product user interface to be developed in the architecture in system 100.

The failsafe upgrade module 112 provides a mechanism for upgrading the software architecture 100. The module 112 can also direct the upgrade of device native components such as middleware, flash memory, or chip microcode. In some implementations, the failsafe upgrade module 112 retrieves upgrade instructions from an external service or network. In general, the failsafe upgrade module 112 performs upgrades non-destructively. That is, the entire upgraded product configuration is constructed in a staging area (e.g., a sandbox), and upon determining a successful configuration construction, the upgrade is enabled. If an attempted upgrade were to fail, the software architecture 100 can provide a "roll back" mechanism to return the system to a previously active configuration. In some implementations, the failsafe upgrade module 112 can provide a locally cached copy of a working configuration if, for example, the system incurs a dual failure (e.g., a failure to upgrade and a failure to roll back). In some implementations, the failsafe upgrade module 112 can use an external service to provide a copy of a working configuration of software. In this fashion, upgrades can also be rolled out to beta populations, device populations, product populations, or regional geographies.

The control module 114 provides scriptable device automation for functionality in the modular framework 102. The control module 114 presents a command-line interpreter that can be fed from serial interfaces, network interfaces, or OEM proprietary interfaces (e.g. microcontroller TTL-level serial) using a simple character I/O protocol. In some implementations, the control module 114 supports scripting of remote control commands and sequences, device automation for home theater applications, network control of system 100 functionality, and embedded micro-control of system 100 applications and services. In some implementations, the control module 114 interpreter is extensible, allowing clients to register commands within the interpreter and to create sub-interpreters to implement access modes and control contexts.

The event log module 116 provides a mechanism to log system-level and user-level events. The logged events can be periodically and securely transferred to an external service to be analyzed, for example. Events such as system health events, remote control events, and application-defined events are generally time-stamped and event-coded so that system states can be reconstructed through data analysis for both defect analysis (e.g., for field technical support and software quality improvement) and user behavior analysis (e.g., for monetization or targeted advertising).

Referring to FIG. 1, the player runtime 106 provides a context for running one or more media player applications 118a-118e and other software. Example media player applications 118a-118e include, but are not limited to, an Adobe Flash Player™ and an Adobe AIR™ application. The player runtime 106 represents a virtual machine which provides software services for processes or programs within an application while the application is running. In this example, the virtual machine runs a media player application.

The player runtime 106 includes a default runtime library 120, a media library 122, and a product library 124. The default runtime library 120 includes a core set of built-in classes. In some implementations, the built-in classes are available to a programmer of a media player application in multiple versions of the modular framework 102. In some implementations, the player runtime 106 can be implemented within the modular framework 102 and configured for a particular electronic device. The configuration is implemented by one or more modules in the modular framework 102.

The media library 122 enables development of rich multimedia applications on various electronic devices. In general, the media library 122 abstracts device specific notions of a media source (e.g., content directory), a media stream (e.g., RSS, MRSS), a media player (e.g., flash codecs, device codecs, and the players used to render), a media item, or combinations thereof. The abstraction provides facilities to work with multimedia objects without having to understand esoteric device or middleware technologies. In addition to multimedia, the media library 122 also provides access to device specific functionality such as hardware configuration and setup using a device independent model, for example.

The product specific library 124 includes a number of product or OEM specific extensions that may not be provided in the default runtime library 120 or the media library 122. The product specific library 124 provides extensions that can be used to add features and functionality not handled by the built-in class libraries.

The player runtime 106 also includes a player port 126. The player port 126 augments a core player runtime with the modular framework functionality. For example, the player port 126 uses dynamically configurable system modules 104 to host modular plug-ins designed to reduce porting times, support dynamic product configurations, and present a runtime model tuned to a number of electronic devices.

The architecture 100 also includes software modules 128. The software modules 128 represent software that implements and registers implementation classes with the system modules 104. In some implementations, software modules 128 appear as a driver or kernel module to the modular framework 102. That is, the software modules 128 may include kernel-like driver interfaces and implementations. A developer can implement a driver for an electronic device using a software module to build in functionality for the electronic device. In some implementations, an OEM can generate one or more optional modules that "plug" into system modules. If, for example, an OEM has written a particularly robust image decoder code module, this code module can be plugged into a system module within environment 100.

As shown in FIG. 1, the software modules 128 include an operating system (OS) module 130, a device module 132, a middleware module 134, and a product module 136. Other modules are possible. The software modules 128 can be abstracted into a virtual machine. For example, the OS module 130 abstracts a set of operating services for operating the framework of architecture 100. The OS module 130 can also abstract basic operating system facilities such as threads, condition variables, mutexes, and time counters.

The device module 132 abstracts device hardware for the library functionalities stored in library module 110 and media library 122. The device module 132 generally facilitates frame buffering for rendering. For example, the device module 132 surfaces hardware devices to the media library 122, which then surfaces access to those resources using a device unified model. Examples of hardware that can be abstracted by the device module 132 include, but are not limited to, audio decoders, video decoders, image decoders, graphics scalers, video scalers, display compositors, 2D, 3D, and video graphics accelerators, input and output connectors, and combinations thereof.

The middleware module 134 abstracts local multimedia capabilities of an electronic device for multimedia functionality. Local multimedia may include, but are not limited to, media sources, media items, media streams, media players, and combinations thereof.

Media sources include any content that can provide (e.g., via browse or search) metadata information about media that can be rendered. For example, in universal plug and play (UPnP) media, media sources are referred to as content directory services. The architecture 100 provides content from multiple content sources including flash memory file systems and scheduled television program listing databases, for example.

Media items represent a type of object referred to by media sources. For example, when media sources are queried or browsed by a user or system, the resulting data sets are lists of media items. Media items are generally hierarchical and can represent an arbitrary level of granularity from a television channel containing many shows to a scene within an individual program or song within an album, for example.

Media streams represent data feeds that can be fed into a media player. Media streams are generally referred to by uniform resource identifiers (URIs) and are instantiated and fed into a media player application by the library module 110, for example. The middleware module 134 can then register the media stream implementations based on a URI scheme Media players represent media device playback engines that can playback media streams. Media players can playback to different locations (e.g., memory, screen). In some implementations, media players can be positioned on a screen with architecture 100 content overlaid in a separate plane. In other implementations, media players can be directed to render content to memory so that the content can be blended directly with video in software.

The product module 136 allows for further customization of a runtime by enabling a product implementer (e.g., developer, OEM) to surface additional libraries to a player runtime. For example, implementers can take advantage of public facilities exposed by the modules hosted by the modular framework 102. This enables the developers to draw on and extend the facilities of the framework 102, as desired. In some implementations, the product module 136 may add a small number of facilities to the player runtime 106, or it may add an entirely new programming model. For example, the product module 136 may surface an extensive set of OpenCable Application Platform (OCAP) style of APIs to the player runtime 106 to add functionality to a particular media player application.

In some implementations, the OS module 130, the device module 132, the middleware module 134, and the product module 136 can be organized into kits of modules. For example, the device module 132 can be implemented as a driver development kit (DDK) having several modules that include device modules such as a graphics driver module, a video decoder module, or other modules. For example, the functions of middleware module 134 can be located inside the DDK. Similarly, the OS module 130 can be implemented as an operating system porting kit (OSPK) that contains multiple operating system modules. Other modules in architecture 100 can also be implemented using kits.

In some implementations, the modules 130-136 can be organized into kits to target specific developer types and workflows. The modules packaged within the kits can be developed without requiring any other kits or source code. As such, the modules in the DDK, for example, may be developed for the modular framework 102 by a third party that does not have access to the actual modular framework 102 or the other modules that comprise a particular implementation of the modular framework 102. As an advantage, the kits provide a particular separation of development of proprietary software by different parties.

At a high level, the architecture 100 enables a developer to author complete suites of software applications that operate on electronic devices in a manner that does not depend on the actual capabilities of the device. Particularly, the architecture 100 provides runtimes of media player applications 118*a*-118*e* that run in the context of the player runtime 106 and ported to the modular framework 102. The modular framework 102 is feature-configured by the static or dynamic inclusion of platform independent system modules 104. The configured modular framework 102 is product enabled by the introduction of the software modules 128. The modular framework 102 specifies a mechanism for software application modules to export platform independent public interfaces as the communication mechanism between modules in the framework 102.

In operation, the modular framework 102 models an abstract machine that contains a real time operating system (RTOS). More particularly, the modular framework 102 models an abstract machine that presents an RTOS style system of operating system programming to the module implementer, independent of one or more underlying operating system. The modular framework 102 can, for example, implement a runtime of a media player and port the player runtime to the abstract machine. For example, a client can request a function of an electronic device and access to particular module functionality by acquiring (e.g., calling in a function) the module. Acquiring the module includes instantiating and exporting a module interface class. There exists exactly one instance of a module interface class created per module at any given time in a process. Thus, the module interface class represents a collection of functions exported by a particular module. In some implementations, the module may call multiple instances of other objects, but generally does so using a "Create( )" and "Destroy( )" method defined in the module interface class. The interface class can be used to configure a runtime for an electronic device.

Configuring the runtime for an electronic device includes abstracting at least one resource in the electronic device. For example, a module, such as the device module 132 abstracts an audio resource of the electronic device. The audio resource may be used when running a media player application. A developer can use the functionality in the electronic device to provide sound in the media player application. Alternatively, the developer can use a resource available in the architecture 100 to provide sound in the media player application. For example, other audio resources can be made available to the media player without otherwise adapting the modular framework or the module if the developer chooses to host another module in the modular framework, rather than the default audio resource. Furthermore, the modular framework can be configured such that all resources, including the resources on an electronic device are optional. That is, developers can choose to implement and configure modular framework resources or the electronic device resources, or a combination of both.

In some implementations, the modular framework 102 provides abstract hardware acceleration facilities for media player applications to operate audio, video, and image acceleration. The architecture 100 can provide a resource if, for example, a module is missing from a particular runtime architecture. More particularly, architecture 100 can supplement a resource for a number of electronic devices, regardless of the platform. For example, if a particular module (e.g., an audio driver) does not exist or is not compatible for a media player runtime, the architecture 100 can provide an appropriate module for sound and mitigate any error or crash that may have occurred in a media player operated without a sound driver.

In some implementations, the architecture 100 interacts with services such as advertisement services, video services, UPnP services, news feed services, signals, or other services. For example, the architecture 100 can support windowed content playback inside of native device application software (e.g., a banner advertisement placed in a C++ or Java device native electronic program guide).

For purposes of explanation only, certain aspects of this specification are described with reference to the discrete elements illustrated in FIG. 1. The number, identity, and arrangement of elements in the architecture 100 are not limited to what is shown. For example, the architecture 100 can include any number of system modules 104 and software modules 128, or devices which may be discrete, integrated modules or distributed systems.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes run on separate machines or a single process running on a single machine. Accordingly, the implementation depicted in architecture 100 is one possible implementation. In some implementations, the application manager module 108 may provide other services and tasks such as organizing functionality between other modules in the architecture 100.

In some implementations, the modular framework 102 is used to implement a sound module in an electronic device for use when the device is running multiple media player instances (e.g., application sessions). The sound module can determine how audio content is to be experienced when multiple media application player instances are running on an electronic device, such as a television. In this example, each of the instances can host different content, such as music content, gaming content (e.g., video games, online games), television or other video content (e.g., IP TV, broadcasts), radio streaming content (e.g., internet radio content), or any other multimedia content outputted from a flash media player application. In some implementations, multiple instances can continuously produce audio content, and the sound module (e.g., hosted by the modular framework 102) determines which of the media player instances should be selected as the source of audio output by the television. That is, the non-chosen instances continue to produce audio content that is currently not heard by the user. The selected audio output can then be generated in the television, in system-on-chip hardware, for example, and the selected audio output can be presented to the user.

Figure 2:
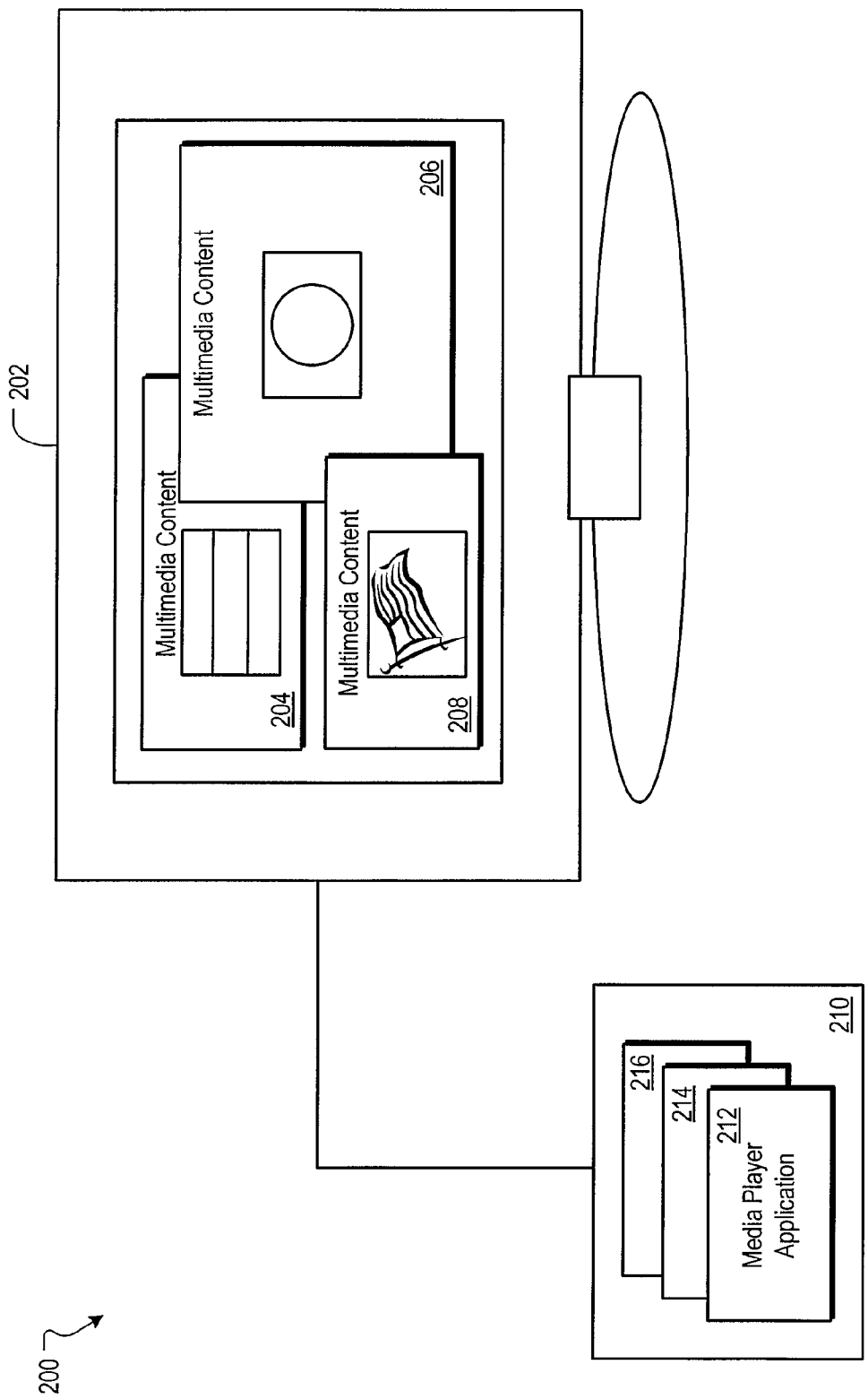
FIG. 2 is a block diagram of an example runtime environment using the architecture of FIG. 1.

FIG. 2 is a block diagram of an example runtime environment 200 using the architecture of FIG. 1. The environment 200 can facilitate the serving of content, e.g., multimedia content in media player applications, to electronic devices. As described in detail below, the environment 200 can provide media player functionality to a television 202 or other electronic devices using architecture 100, for example.

As shown in FIG. 2, the environment 200 includes a television 202 hosting multimedia (e.g., video and audio) outputs 204, 206, and 208. More or fewer multimedia outputs can be used. In this example, the multimedia outputs 204-208 represent content in the German language (204), content in the Japanese language (206), and content in the English language (208). Multimedia output here includes a dialog or audio track combined with video content. For example, the German multimedia output 204 may include an online news cast, a YouTube™ video, a television commercial, or other content. The Japanese multimedia content 206 may include a gaming site, a television show, or other content. The English multimedia content 208 may include a broadcast news show, an online rented movie, or other content.

The television 202 is connected to a computer 210 hosting media player applications 212, 214, and 216. The computer 210 can be implemented as a standalone unit, or inside the television 202, or be included in a set-top box, to name a few examples. The media player applications 212, 214, and 216 generate the video content 204, 206, and 208, respectively. In this example, the user is viewing the television and has opened three media player applications 212, 214, and 216. Although here depicted as originating from three separate media player applications 212-216, in some implementations, the media player instances 204-208 are instances of a single media player application 212.

In each media player application, audio and video content is being executed and accordingly, output is displayed in respective multimedia outputs 204-208. That is, each media player instance 212-216 generates corresponding multimedia outputs 204-208 that are presented to a user on a graphical user interface (GUI) of an electronic device. In this example, the electronic device is the television 202.

In this example, the user may perceive three audio content tracks and three video content tracks being output from the multimedia outputs 204-208. The environment 100 can mitigate the confusion of having multiple audio outputs inundating a user. For example, the environment 100 can determine which media player application instance currently has the focus, such as because this video output has been selected to run in the foreground. Specifically, a sound module, running on framework 102, for example, can identify a first video output 208 (e.g., the English multimedia output) that has the focus (e.g., by being the active window) in the graphical user interface on the television 202. The English multimedia output 208 is here the active application and resides on top of the multimedia outputs 204 and 206. In some implementations, a sound module (in the modular framework 102) selects the in-focus media player instance 208 to provide the audio output to be used by the television 202. In some implementations, a media player instance can be selected independently of respective video outputs generated by the media player instances. For example, a media player not currently in focus is selected for generating audio output and the audio output from the media player in focus is not output to the user. In short, the "audio focus" can depend on the application focus or can be independent thereof.

The user can choose to change focus to another application in the television 202 at any time. In such a case, the audio output may follow the visual focus (e.g., the active window) selected by the user. For example, if the focus is changed from the English multimedia output 208, playing audio in the English language, to the German multimedia output 204, the environment 200 can swap the audio output to the German language as the user changes visual focus. Similarly, if the focus is changed to the Japanese multimedia output 206, the environment 200 can swap the audio output to the Japanese language as visual focus is changed. In some implementations, the environment 200 provides a switching of audio output sources for more than three applications.

Certain user events can cause a media player application to have audio focus. For example, the user may be actively watching an active window of a media player application and the environment 200 can choose the active window as the audio focus of the electronic device. In another example, the system may automatically select a hierarchy of audio focus e.g., television first, music videos next and so on.

In general, media player applications are unaware of whether they have audio focus or not which is due, in part, to the driver architecture. As such, the media player instances 204-206 including the selected media player instance 208 can continue to generate audio output while only the audio output from the selected media player instance 208 is generated for the user on the electronic device.

Figure 3:
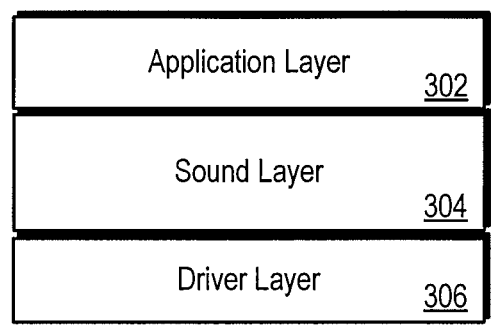
FIG. 3 is a block diagram of an example architecture 300 for determining an audio output source.

FIG. 3 is a block diagram of an example architecture 300 for determining an audio output source. At a high level, the architecture 300 enables external management of an audio system on an electronic device. The architecture 300 is implemented using a modular framework configured for hosting sound modules, for example, that configure multiple media player runtimes on an electronic device. The architecture 300 can be used to support an arbitrary set of software applications targeted toward multimedia enjoyment on a television, a gaming device, a computer, an electronic picture frame, a handheld device, a set-top box, an appliance, or other electronic device.

As shown in FIG. 3, the architecture 300 includes an application layer 302, a sound layer 304, and a driver layer 306. The application layer 302 can be used to implement one or more media player applications 118a-118e (e.g., an Adobe Flash Player™ application, an Adobe AIR™ application). In this example, the architecture 300 models an abstract machine. The architecture 300 ports the applications 302 (e.g., instances of applications 302) into the abstract machine enabling the abstract machine to run a media player application. The modular framework can be framework 102 and can be configured so that all resources including the sound layer 304 and driver layer 306 are optional.

The sound layer 304 may include audio output rules and/or configurations for particular electronic devices. For example, the sound layer 304 may include configurations for sound management features, such as blending audio with video, blending audio with audio. The sound layer 304 may also include configurations for altering, routing, or otherwise transforming an audio output signal. For example, the sound layer 304 can be used to alter pitch or timbre of an audio output signal. The sound layer 304 can be used to dampen, enhance, fade, or otherwise modify an audio output signal. In some implementations, the sound layer 304 includes instructions for determining which of a number of media player instances is best suited for receiving audio output on an electronic device. The instructions may include a set of rules for how to determine which audio output to present in a media player application.

The driver layer 306 may include a number of drivers to support hardware in electronic devices. For example, the driver layer 306 can include drivers (not shown) such as audio output drivers, null audio output drivers, output to disk drivers, output to network drivers, or other drivers. The audio output drivers determine audio output characteristics and may be used to dampen, enhance, fade, or otherwise modify an audio output signal. The null audio output drivers can be used as a filler driver if, for example, a media player application is not selected as the main audio source. That is, the null audio output drivers plug into a standard audio output driver in a running electronic device when the audio content of a particular media player application is unselected by the system, or when the media player application is not the user's visual focus. The output to disk drivers and the output to network drivers can determine to output audio to a disk or stream the audio output over a network, respectively. These drivers can, for example, be used to store audio content for later review.

In some implementations, the driver layer 306 abstract device hardware for a number of library functionalities. For example, the driver layer 306 can abstract audio decoders, audio compositors, and other audio hardware. The driver layer 306 generally facilitate frame buffering for rendering audio content. For example, the driver layer 306 can surface hardware devices to a library, which then surfaces access to resources using a device unified model.

In operation, the driver layer 306 generally support one or more sound module 304 (or other modules) and the applications 302 receive "plug-ins" of both the sound layer 304 and the driver layer 306. A developer can select driver layer 306 (e.g., audio output drivers, null audio output drivers, output to disk drivers, output to network drivers) to perform audio blending on the applications 302 using the sound layer 304. Audio blending generally includes blending audio content with video content such that the blended content is the focus of the main audio output that is heard in an electronic device and the focus of one video output. Particularly, rather then blending audio output from all of the running applications on a television, for example, the architecture 300 can select one media player application as having "audio focus" and can cause the other running media player applications to not present audio output a user. In some implementations, the audio focus appears transparent to the actual media player applications. For example, the architecture 300 can push the audio output control logic into the driver layer 306 such that the media player application does not detect swapping of audio driver modules and thus, the application does not detect the sound behavior change (e.g., muting, blending).

In some implementations, the audio blending occurs in the sound layer 304. For example, the sound layer 304 can blend audio outputs from a two or more media player instances with video content from one or both instances. The blending includes introducing audio output from a first media player instance into audio output and video content of a second media player instance. As an example, the sound layer 304 can first identify a first and second instance of a media player on a hardware device. The sound layer 304 then determines which of the media player instances provides a relevant selection for an audio output source. For example, if a user is watching a television show in a first media player instance and playing a video game in a second media player instance (over the television show), the sound layer 304 may determine that the video game is in focus, and thus important to the user. The sound layer 304 can use system rules to determine that the video game audio output should be presented, or the sound layer 304 can determine that the video game audio output and the television audio output should be blended with the video content of the (active window) video game. The blending ensures that the user will hear both the television show audio and the video game audio while playing the video game in the foreground of the television.

At the driver level, the media player instances process all audio information as if the two instances were separate. However, the audio may or may not be outputted to the user if, for example, the system determines to mask audio from one or more media player instances. For example, if the user above had a third media instance (e.g., a music application) running in the background, the system may mute the music application audio output in favor of the television audio output. The sound layer 304 generally includes rule for determining the hierarchy of which sources are outputted over other sources.

Figure 4:
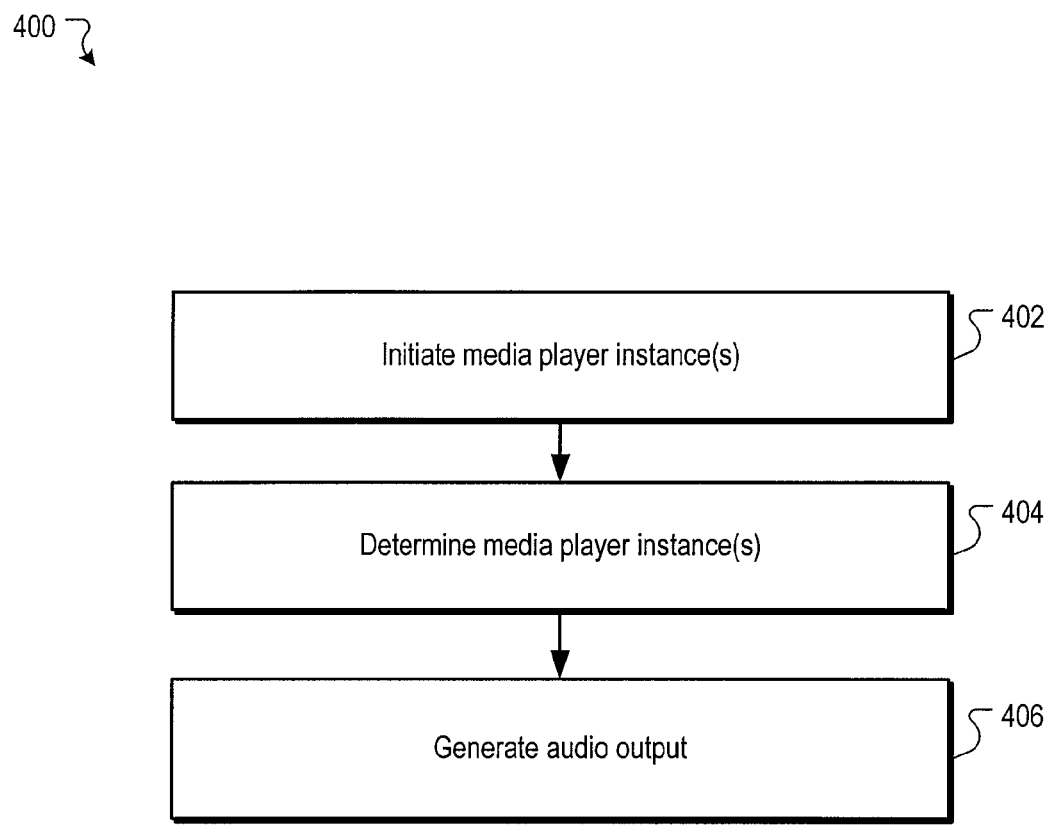
FIG. 4 is a flow diagram of an example method for determining an audio output source.

FIG. 4 is a flow diagram of an example method 400 for determining an audio output source. Determining an audio output source can be performed to dampen or mitigate extraneous audio content. Extraneous audio content generally includes any audio content running in a background application (e.g., an unfocused application window). For convenience, the method 400 will be described with respect to a system architecture (e.g., a cross-platform runtime architecture 300) that performs the method 400. The architecture 300 can be implemented or associated with hardware components, software components, or firmware components, or any combination of such components. The architecture can, for example, be implemented or associated with general purpose servers, software processes and engines, and/or various embedded systems. In some implementations, the method 400 can be executed in the architecture 100, rather than architecture 300. In other implementations, the method 400 can be executed in a combination of both architectures 100 and 300.

Although method 400 is described as implemented within a television device, the method 400 can be implemented on any number of hardware devices including, but not limited to a computer, a handheld device, a consumer electronics device, a set-top box, an appliance, an electronic picture frame, a cellular telephone, a gaming device, or combinations thereof.

The architecture 300 initiates (402) a number of media player instances. The television device can present any number of media player instances within the television screen. The media player instances are generally implemented using the modular framework 102 hosted on the television. The television can be configured to have any number of media player runtimes implemented on the device. In addition, the television can host modules (e.g., system modules 104, software modules 128, and/or driver layer 306) that configure any of the types of media player runtimes for the television.

The architecture 300 determines (404) a media player instance that should be used for audio output by an electronic device. For example, the architecture 300 can make a determination about which audio output is most relevant to a user's preference. In particular, the architecture 300 can use a sound module to determine which media player instance is currently outputting the most relevant or user-preferred audio output signal. In some implementations, the sound module is the sound layer 304 hosted in architecture 300.

In some implementations, the architecture 300 utilizes the focus of a particular application to determine the audio output. For example, the architecture 300 determines which application the use is focused upon (i.e., the active window). The "active" application can then be determined as the appropriate audio output source. In some implementations, the architecture 300 provides a blending of one or more audio output sources, if for example, the user is interacting with a game that has minimal sound effects and a television program with a full sound track.

In some implementations, the architecture 300 determines to provide a particular audio output independent of the respective video outputs generated by the media player instances. For example, the architecture 300 may be programmed with user-selectable audio output rules. The audio output rules can, for example, dictate on an electronic device, which audio output takes precedence over a group of audio outputs. For example, one rule may indicate that a television audio output takes precedence over a gaming application audio output, but a music application audio output takes precedence over the television audio output. In this fashion, the user can predetermine a hierarchy of audio output preferences. Other audio output rules are also possible.

The architecture 300 generates (406) audio output using the television device. Upon determining which audio output produced by at least one of the media player instances, the architecture 300 generates the audio output for presentation on the television or other electronic device.

Figure 5:
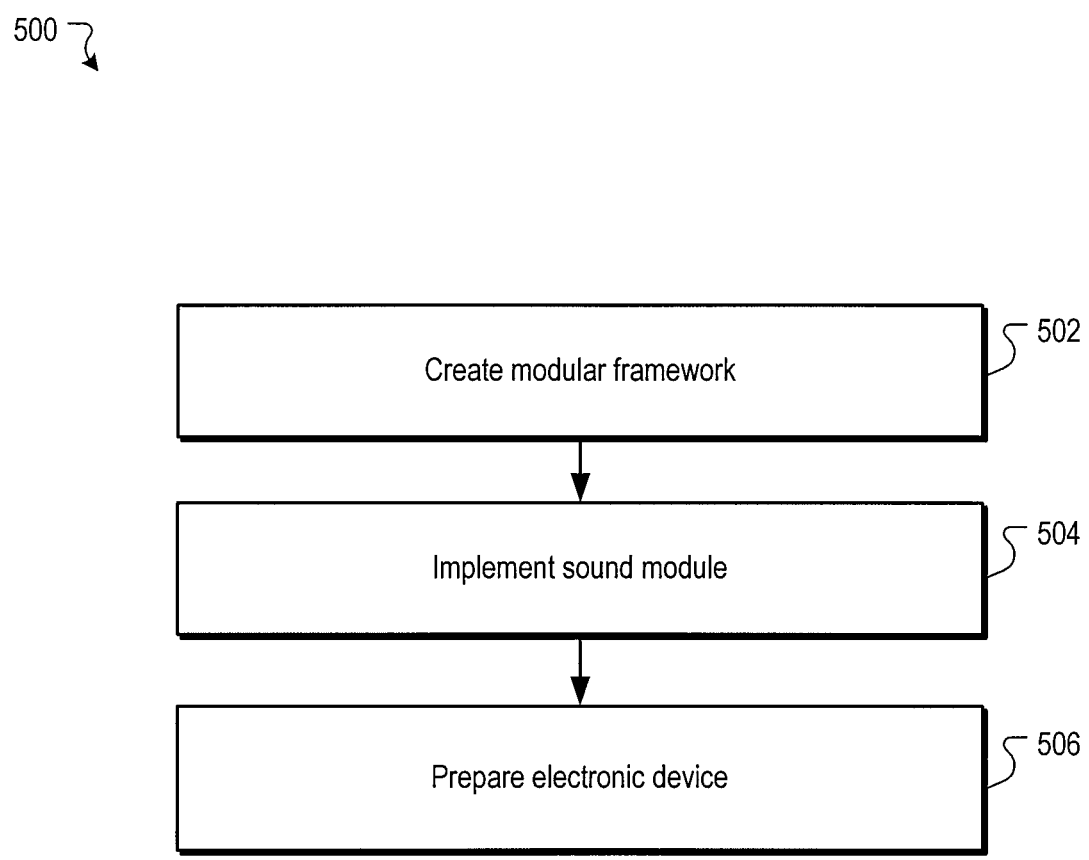
FIG. 5 is a flow diagram of an example method for generating a media player instance.

FIG. 5 is a flow diagram of an example method 500 for generating a media player instance. For convenience, the method 500 will be described with respect to a system architecture (e.g., a cross-platform runtime architecture 100) that performs the method 400. The architecture 100 can be implemented or associated with hardware components, software components, or firmware components, or any combination of such components. The architecture can, for example, be implemented or associated with general purpose servers, software processes and engines, and/or various embedded systems. In some implementations, the method 500 can be performed without the architecture 100.

The architecture 100 creates (502) a modular framework. The modular framework may be the modular framework 102 or another framework with more or less modules. The modular framework is configured to have each of multiple types of media player runtimes implemented within the framework. In general, the modular framework hosts modules that configure any of the types of media player runtimes for electronic devices. The modular framework can be used to facilitate rapid software application development by third parties (e.g., original equipment manufacturers (OEMs)). For example, an OEM can use the modular framework for porting a media player application to a new platform and/or electronic device. In some implementations, the modular framework hosts independent software modules and driver modules that can configure audio features and parameters.

The architecture 100 implements (504) a sound module. The sound module may be the sound layer 304 hosted on a television, for example. The sound layer 304 can be configured to determine which of the media player instances should be used for audio output by a particular electronic device. For example, audio output rules can be implemented into the sound layer 304. The architecture can begin to implement the sound layer 304 by abstracting electronic device hardware, such as an audio decoder, 2D, 3D and video graphics accelerators. The abstraction can provide a pluggable sound layer 304 which includes audio output rules and/or configurations usable by the electronic device.

The architecture 100 prepares (506) an electronic device for execution of the media player instances. For example, the architecture 100 uploads sound configurations to the electronic device and performs a swap of the current sound layer operating on the electronic device with a new sound layer having modular functionality. That is, the architecture 100 transparently swaps out which media player application is currently rendering the system-selected audio output, as determined by the sound layer. In some implementations, swapping sound layers functionality is performed independently of current electronic device tasks. For example, audio output can be processed uninterrupted while the architecture 100s swaps sound layers.

In some implementations, the preparation includes remaining steps for finishing the electronic device into a marketable product, such as installing remaining software components, hardware components, circuitry and/or other parts of the product before it is shipped or used.

Some portions of the detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a blu-ray player, a television, a set-top box, or other digital devices.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, an infrared (IR) remote, a radio frequency (RF) remote, or other input device by which the user can provide input to the computer. Inputs such as, but not limited to network commands or telnet commands can be received. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer program product embodied in a non-transitory tangible program carrier and comprising instructions that when executed by a processor perform a method comprising:
   initiating media player instances for producing output by execution on an electronic device, each of the media player instances being implemented using a modular framework on the electronic device configured to have each of multiple types of media player runtimes implemented therein and to host modules that configure any of the types of media player runtimes for respective device types;
   determining, using a sound module of the modular framework, which of the media player instances should be used for audio output by the electronic device, wherein making the determination comprises selecting, based on a video output, one of the media player instances to be used for audio output by the electronic device; and
   generating the video output and the audio output using the electronic device, the video output and the audio output produced by at least one of the media player instances as determined.

2. The computer program product of claim 1, wherein the media player instances generate corresponding video outputs presented to a user on a graphical user interface of the electronic device, and wherein making the determination comprises:
   identifying a first video output that has focus in the graphical user interface; and
   selecting, based on the identification, one of the media player instances that generates the first video output to be used for audio output by the electronic device.

3. The computer program product of claim 2, wherein the media player instances including the selected media player instance continue to generate audio output while only the audio output from the selected media player instance is generated by the electronic device.

4. The computer program product of claim 1, wherein making the determination comprises:
   identifying at least first and second media player instances; and
   blending audio outputs from the first and second media player instances.

5. The computer program product of claim 4, wherein the first media player instance is currently generating video output, and wherein the blending introduces the audio output from the second media player instance.

6. The computer program product of claim 1, wherein the sound module is configured to perform the determination with regard to an arbitrary number of media player instances.

7. The computer program product of claim 1, wherein the media player instances are instances of one media player application.

8. The computer program product of claim 1, wherein the modular framework models an abstract machine and the media player instances are ported to the abstract machine.

9. The computer program product of claim 1, wherein the modular framework is configured so that all resources including the sound module are optional.

10. The computer program product of claim 1, wherein the electronic device includes at least one device selected from: a computer; a handheld device; a consumer electronics device; a television; a set-top box; an appliance; an electronic picture frame; a cellular telephone; a gaming device; and combinations thereof.

11. A computer program product embodied in a non-transitory tangible program carrier and comprising instructions that when executed by a processor perform a method comprising:
   creating a modular framework on an electronic device for implementing media player instances, the modular framework configured to have each of multiple types of media player runtimes implemented therein and to host modules that configure any of the types of media player runtimes for respective device types;
   implementing a sound module in the modular framework, the sound module configured to determine which of the media player instances should be used for audio output by the electronic device, wherein making the determination comprises selecting, based on a video output, one of the media player instances to be used for audio output by the electronic device; and
   preparing the electronic device for execution of the media player instances, wherein the electronic device generates the video output and the audio output produced by at least one of the media player instances as determined by the sound module.

12. The computer program product of claim 11, wherein the media player instances generate corresponding video outputs on a graphical user interface of the electronic device, and wherein the sound module selects one of the media player instances that has focus in the graphical user interface for generating the audio output.

13. The computer program product of claim 11, wherein the sound module selects one of the media player instances for generating the audio output independently of respective video outputs generated by the media player instances.

14. The computer program product of claim 11, wherein the sound module blends audio outputs from at least first and second media player instances.

15. A system comprising:
   an electronic device configured to present media output; and
   a computer-readable medium accessible to the electronic device and comprising:
      a modular framework configured for having each of multiple types of media player runtimes implemented therein and for hosting modules that configure any of the multiple types of media player runtimes for respective device types;
      media player instances implemented in the modular framework, each media player instance configured for execution by the electronic device to produce output; and
      a sound module implemented in the modular framework, the sound module configured to determine which of the media player instances should be used for audio output by the electronic device, wherein making the determination comprises selecting, based on a video output, one of the media player instances to be used for audio output by the electronic device.

16. The system of claim 15, wherein the media player instances generate corresponding video outputs on a graphical user interface of the electronic device, and wherein the sound module selects one of the media player instances that has focus in the graphical user interface for generating the audio output.

17. The system of claim 15, wherein the electronic device includes at least one device selected from: a computer; a handheld device; a consumer electronics device; a television; a set-top box; an appliance; an electronic picture frame; a cellular telephone; a gaming device; and combinations thereof.

18. The system of claim 15, wherein the sound module blends audio outputs from at least first and second media player instances.

19. A computer-implemented method comprising:
   initiating media player instances for producing output by execution on an electronic device, each of the media player instances being implemented using a modular framework on the electronic device configured to have each of multiple types of media player runtimes implemented therein and to host modules that configure any of the types of media player runtimes for respective device types;
   determining, using a sound module of the modular framework, which of the media player instances should be used for audio output by the electronic device, wherein making the determination comprises selecting, based on a video output, one of the media player instances to be used for audio output by the electronic device; and
   generating the video output and the audio output using the electronic device, the video output and the audio output produced by at least one of the media player instances as determined.

20. A computer-implemented method comprising:
   creating a modular framework on an electronic device for implementing media player instances, the modular framework configured to have each of multiple types of media player runtimes implemented therein and to host modules that configure any of the types of media player runtimes for respective device types;
   implementing a sound module in the modular framework, the sound module configured to determine which of the media player instances should be used for audio output by the electronic device, wherein making the determination comprises selecting, based on a video output, one of the media player instances to be used for audio output by the electronic device; and
   preparing the electronic device for execution of the media player instances, wherein the electronic device generates audio output produced by at least one of the media player instances as determined by the sound module.

21. A system comprising:
   one or more processors; and
   a computer program product embodied in a non-transitory tangible program carrier and comprising instructions that when executed by the one or more processors perform a method comprising:
      initiating media player instances for producing output by execution on an electronic device, each of the media player instances being implemented using a modular framework on the electronic device configured to have each of multiple types of media player runtimes implemented therein and to host modules that configure any of the types of media player runtimes for respective device types;

determining, using a sound module of the modular framework, which of the media player instances should be used for audio output by the electronic device, wherein making the determination comprises selecting, based on a video output, one of the media player instances to be used for audio output by the electronic device; and generating the first video output and the audio output using the electronic device, the first video output and the audio output produced by at least one of the media player instances as determined.

* * * * *